(12) United States Patent
Schein

(10) Patent No.: US 10,809,084 B2
(45) Date of Patent: Oct. 20, 2020

(54) U-TURN EVENT TAGGING AND VEHICLE ROUTING

(71) Applicant: Ford Global Technologies, LLC, Dearborn, MI (US)

(72) Inventor: Victoria Leigh Schein, Dearborn, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 146 days.

(21) Appl. No.: 15/763,793

(22) PCT Filed: Nov. 9, 2015

(86) PCT No.: PCT/US2015/059749
§ 371 (c)(1),
(2) Date: Mar. 27, 2018

(87) PCT Pub. No.: WO2017/082858
PCT Pub. Date: May 18, 2017

(65) Prior Publication Data
US 2019/0049258 A1 Feb. 14, 2019

(51) Int. Cl.
| | | |
|---|---|---|
| G01C 21/34 | (2006.01) | |
| G01C 21/36 | (2006.01) | |
| G07C 5/02 | (2006.01) | |
| G08G 1/16 | (2006.01) | |
| G08G 1/0962 | (2006.01) | |
| G08G 1/0968 | (2006.01) | |

(52) U.S. Cl.
CPC ..... *G01C 21/3461* (2013.01); *G01C 21/3608* (2013.01); *G01C 21/3664* (2013.01); *G01C 21/3694* (2013.01); *G07C 5/02* (2013.01); *G08G 1/09626* (2013.01); *G08G 1/167* (2013.01); *G08G 1/096877* (2013.01)

(58) Field of Classification Search
None
See application file for complete search history.

(56) References Cited

U.S. PATENT DOCUMENTS

| | | | |
|---|---|---|---|
| 7,598,889 B2 | 10/2009 | Maeda | |
| 8,010,249 B2 | 8/2011 | Liebl et al. | |
| 8,610,595 B1 * | 12/2013 | Aleteeby | G08G 1/096741 340/435 |

(Continued)

FOREIGN PATENT DOCUMENTS

JP 2011077898 A 4/2011

*Primary Examiner* — Peter D Nolan
*Assistant Examiner* — Ce Li Li
(74) *Attorney, Agent, or Firm* — David R. Stevens; Stevens Law Group

(57) ABSTRACT

Methods, systems, and apparatuses for logging U-turn events and vehicle routing are disclosed. A method for logging a U-turn event includes detecting, at a navigation system, a button press on a human interface device separate from the navigation system based on a signal received from the human interface device. The method also includes, in response to the user input, determining a location of a vehicle corresponding to the navigation system and one or more vehicle characteristics. The method also includes logging U-turn event data for the vehicle, the U-turn event data comprising the location and the one or more vehicle characteristics.

20 Claims, 6 Drawing Sheets

(56) References Cited

U.S. PATENT DOCUMENTS

| | | | | |
|---|---|---|---|---|
| 8,892,310 B1* | 11/2014 | Palmer | ............... | G07C 5/008 |
| | | | | 701/41 |
| 9,056,616 B1 | 6/2015 | Fields | | |
| 10,360,793 B1* | 7/2019 | Costantini | ........ | G06K 9/00791 |
| 2001/0032461 A1* | 10/2001 | Biggi | ................ | B62D 5/093 |
| | | | | 60/384 |
| 2007/0072583 A1 | 3/2007 | Tamir et al. | | |
| 2008/0046176 A1* | 2/2008 | Jurgens | ............ | H04L 67/325 |
| | | | | 701/414 |
| 2011/0130916 A1* | 6/2011 | Mayer | ............... | G08G 1/127 |
| | | | | 701/31.4 |
| 2011/0153199 A1 | 6/2011 | Morimoto et al. | | |
| 2013/0135472 A1 | 5/2013 | Wu et al. | | |
| 2013/0302758 A1* | 11/2013 | Wright | ............... | G07C 5/008 |
| | | | | 434/65 |
| 2013/0311081 A1* | 11/2013 | Yamakawa | .......... | G01C 21/36 |
| | | | | 701/428 |
| 2017/0336218 A1* | 11/2017 | Beaurepaire | ......... | G08G 1/167 |
| 2018/0165893 A1* | 6/2018 | Palmer | ............... | G07C 5/008 |

* cited by examiner

U-TURN EVENT TAGGING AND VEHICLE ROUTING

RELATED APPLICATIONS

This application claims the benefit of PCT Application Serial No. PCT/US2015/059749, filed Nov. 9, 2015, which is hereby incorporated herein by reference in its entirety for all purposes.

TECHNICAL FIELD

The disclosure relates generally to methods, systems, and apparatuses for logging U-turn events and vehicle routing.

BACKGROUND

Automobiles provide a significant portion of transportation for commercial, government, and private entities. Frequently, accidents result from driver distraction due to manipulation or use of electronic equipment such as mobile phones, navigation systems, radios, or the like. Driving maneuvers that can be particularly dangerous include U-turns. Due to the high value of automobiles and potential harm to passengers, drivers, and payloads, reductions in driver distraction can be very beneficial.

Improvements of vehicle, driver and passenger safety are significant within the automotive industry. However, applicants have recognized significant dangers and needs that currently are unaddressed by current vehicle navigation and event logging systems. For example, a U-turn is a driving maneuver that is extremely dangerous and is frequently a reason for driving accidents. A driver making a U-turn must often make quick decisions to determine requirements or safety of a U-turn they are about to execute. In the case of those driving large vehicles or vehicles that are pulling trailers, sometimes a navigation system may instruct a user to make a driving maneuver, such as a U-turn, but the large vehicle or the vehicle pulling a trailer of the like does not have a sufficient turning radius to make the U-turn where the global positioning system (GPS) instructs the user to make such a maneuver. Thus, the U-turn navigation system may be prompting a user to make a maneuver that is not safe considering the vehicle's size or turn radius (which may include additional attachments, such as a trailer, adding to the length of the vehicle). For example, since current navigation systems, such as smartphones and in-vehicle global positioning systems do not take into account vehicle parameters into their algorithms, they do not know whether or not a U-turn is safe for the vehicle they are helping to navigate and re-route.

Existing systems provide community-based traffic and navigation information using a smartphone application. These existing systems allow drivers to share real-time traffic and road information to save time, gas money, and improve daily commuting. Users can actively report accidents, police traps, and other hazards they see on the road. Users can also obtain road alerts and can find the lowest gas prices, as shared by the community. Also, users can add friends, send locations, or keep others posted on an arrival time. Although, existing systems allow for event tagging, users must go inside of the mobile application and enter a custom tag while driving to send these events to the data cloud. Tagging in this interface is extremely dangerous for the user to do while they are driving. Furthermore, these existing systems do not specifically provide for tagging different types of U-turn events.

What is needed are systems, methods, interfaces, and devices that are efficient at providing safe real-time U-turn logging and routing. As will be seen, the disclosure provides such systems, methods, interfaces, and devices that are efficient at providing safe real-time U-turn logging and routing in an effective and elegant manner.

BRIEF DESCRIPTION OF THE DRAWINGS

Non-limiting and non-exhaustive implementations of the present disclosure are described with reference to the following figures, wherein like reference numerals refer to like parts throughout the various views unless otherwise specified. Advantages of the present disclosure will become better understood with regard to the following description and accompanying drawings where.

DETAILED DESCRIPTION

Figure 1:
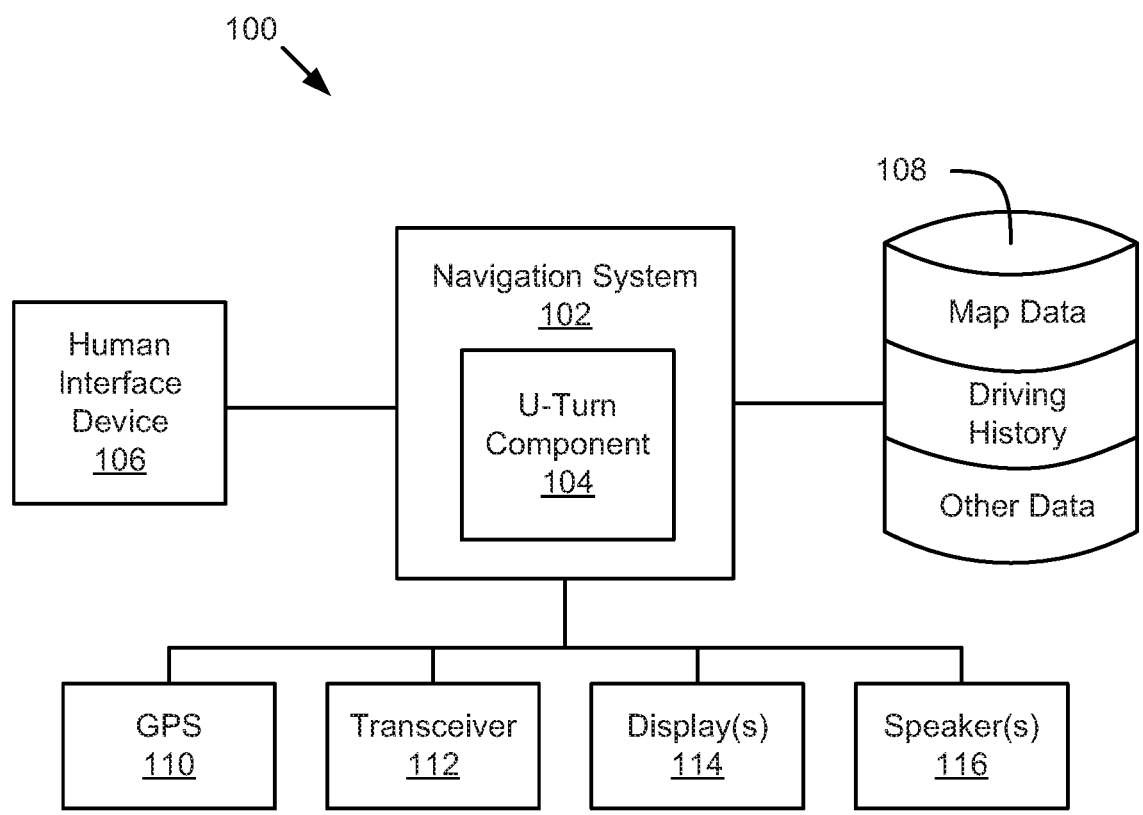
FIG. 1 is a schematic block diagram illustrating an implementation of a U-turn logging and routing system.

The current disclosure presents systems, methods, interfaces, and devices for safe real-time U-turn logging and routing. Tagging events, like a U-turn, should be completed in a safe enough manner so that users do not need to take their focus off the road in order to interact with a navigation system or mobile device. The user should have an accessible way to tag events while they are driving and the ability to customize multiple different modes on a device for each event tag command so that they do not have to input multiple, different types of U-turn event tags while driving. Additionally, tagged U-turn events (e.g., obstacles, successes, experiences) can help a shape a driver's perspective and future route choices, such as avoiding certain U-turn maneuvers at a location, intersections with frequent near miss U-turns and U-turn accidents, and other potential situations involving U-turns.

In one embodiment, a system may include a human machine interface that is separate from a smart phone or in-dash navigation system. For example, the human machine interface may include a multi-modal mechanical push button, or capacitive touch sensitive button, that is within easy reach of the driver. The human interface device may receive user input from a user and may be easy for a user to touch or push without looking away from the road while driving. In one embodiment, a press or touch on the human interface device may be used to indicate when a U-turn event occurs. The human interface device may be installed or mounted in the vehicle or by a user using an attachment mechanism such as a strap, an adhesive, a steering wheel clamp, or the like, that allows the tagging system to be accessible, modular and safe for the user to implement into a user's everyday drive.

The system may also include an application running on a mobile computing device, such as a smartphone, vehicle navigation system (in-dash or dash mounted), tablet computer, laptop, or any other computing device. In one embodiment, the application may log and save location and real-time U-turn data locally or at a remote location (e.g., on an Internet-accessible server) in response to input on the human interface device. For example, a smartphone may receive a Bluetooth Low Energy signal from the human interface device that indicates the occurrence, status, success, or other details of a U-turn.

A human interface device may include any mechanical button or switch or other non-mechanical input device that is user-friendly and easily accessible to the driver of the vehicle. U-turn tags may be saved for personal usage, and may also be shared with other drivers. Before driving, a user may specify, such as in a mobile application, different inputs that correspond to different U-turn event tags. For example, a single click may correspond to one type of U-turn event, while a double click or a long press may correspond to other events. Thus, the user may simply provide the input and the mobile phone or navigation system may log the event. During a drive, a user may encounter or see a U-turn incident. For example, the driver may witness or be involved in 1) an accident caused by a U-turn, 2) a successful U-turn, or 3) a near miss accident from an attempted U-turn.

According to one example use case, every time a user sees or executes a U-turn, they provide input for the type of U-turn event that had occurred. For example, a one button click on a human interface device may indicate that there was an attempted U-turn at a specific location and the application will store an event tag (e.g., a U-turn attempt) with the user's GPS location and current time. A two button click may indicate (but is not limited to) a near miss, accident, unsuccessful, or unsafe U-turn, which may be logged by the application with a specific location and time. A long press may indicate that a user has completed a successful and safe U-turn, which can be similarly logged. When the user is finished driving, the user can also go back and review, modify, and/or share the tags. A chronological or map display of the tags may be available to the user so that the user can visualize preferred and non-preferred routes and U-turn locations. In one embodiment, the tags may also display on a navigation map while driving so that the user can see U-turn locations that have previously been tried and/or tagged as successful or dangerous.

In one embodiment, logs with each event may include one or more vehicle characteristics. For example, users with large vehicles, trailers, or tow trucks may benefit from unique tags specific to their vehicle sizes or vehicle types. For example, larger vehicles generally have more trouble performing U-turns and they can see locations where U-turns with their vehicle sizes have been successful or unsuccessful. These tags may be viewable to other drivers who may benefit from the shared experiences of other drivers with the same or similarly sized or configured vehicles. For example, a user with a truck who has a smartphone GPS or in-vehicle GPS may identify the vehicle they are driving from the specific vehicle characteristics and determine a route based on the U-turn tags. In one embodiment, a mobile phone or navigation system may determine one or more vehicle characteristics such as model, vehicle length, vehicle turning radius, the presence and length of any trailers (or a towed vehicle) or the like. The smart phone or logging device may log the vehicle characteristics or may use the vehicle characteristics for planning of future routes.

In one embodiment, the navigation system or mobile computing device may provide navigation instructions (audio and/or visual instructions) based on U-turn event data and/or vehicle characteristics. For example, the navigation system may know when the vehicle will not be able to make a specific U-turn that has been programmed into the set route, and may recalculate a new route for the user to take that is safe and includes no U-turns, or U-turns that are safe for the vehicle's known turn-radius.

In the following disclosure, reference is made to the accompanying drawings, which form a part hereof, and in which is shown by way of illustration specific implementations in which the disclosure may be practiced. It is understood that other implementations may be utilized and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Implementations of the systems, devices, and methods disclosed herein may comprise or utilize a special purpose or general-purpose computer including computer hardware, such as, for example, one or more processors and system memory, as discussed in greater detail below. Implementations within the scope of the present disclosure may also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media (devices). Computer-readable media that carry computer-executable instructions are transmission media. Thus, by way of example, and not limitation, implementations of the disclosure can comprise at least two distinctly different kinds of computer-readable media: computer storage media (devices) and transmission media.

Computer storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Further, where appropriate, functions described herein can be performed in one or more of: hardware, software, firmware, digital components, or analog components. For example, one or more application specific integrated circuits (ASICs) can be programmed to carry out one or more of the systems and procedures described herein. Certain terms are used throughout the following description and Claims to refer to particular system components. As one skilled in the art will appreciate, components may be referred to by different names. This document does not intend to distinguish between components that differ in name, but not function.

Referring now to the figures, FIG. 1 illustrates a U-turn logging and routing system 100. The U-turn logging and routing system 100 may be used to quickly and automatically log U-turn events in response to a user interacting with a push button or other human interface device. The U-turn logging and routing system 100 may also calculate a vehicle route based on a log of U-turn events and/or vehicle characteristics. For example, the U-turn logging and routing system 100 may route the vehicle to avoid performing U-turns at locations where the vehicle cannot safely perform U-turns. The U-turn logging and routing system 100 includes a navigation system 102, a U-turn component 104, and a human interface device 106. The U-turn logging and routing system 100 may also include a data store 108, a GPS 110, a transceiver 112, a display 114, and a speaker 116. The components 102-116 of the U-turn logging and routing system 100 are provided by way of example only and may not all be included in all embodiments. In fact, some embodiments may include only one or two or more of the components 102-116. Furthermore, the components 102-116 may be combined or separated into different devices or systems without limitation. For example, the U-turn component 104 may be located on a smart phone while the navigation system 102 may be part of an in-dash navigation system.

The navigation system 102 may include a system that routes a vehicle along a path to a destination. For example, the navigation system 102 may include an in-dash or vehicle mounted mapping and navigation system, such as a vehicle GPS. As another example, the navigation system 102 may include a mobile computing device, such as a smart phone, tablet, or other computer. The navigation system 102 may include a processor, circuitry, and/or software for routing a vehicle to a destination. Example existing navigation systems may include a mapping or routing system or software from Google Garmin®, Apple®, TomTom Magellan®, or the like. For example, existing navigation systems may be modified to include a U-turn component 104 (discussed below) or may communicate with or receive instructions from a U-turn component 104 to implement at least a portion of the functionality or realize an apparatus or system disclosed herein.

The U-turn component 104 is configured to log an occurrence of a U-turn event. In one embodiment, the U-turn component 104 may log an occurrence of a U-turn event, along with a time and location, memory local to the U-turn logging and routing system 100 or at a remote location. In one embodiment, the U-turn event data stored in the log may include one or more vehicle characteristics of the vehicle performing the U-turn and/or an indication of the success or safety of the U-turn. For example, if the U-turn was performed safely and there was sufficient room to allow for the turning radius of the vehicle, the U-turn event data may indicate a successful and safe U-turn event. On the other hand, if there was a near miss, a resulting accident, or the vehicle was not able to perform the U-turn while remaining on the road (e.g., had to stop and back up to complete the U-turn) the U-turn event data may indicate that the U-turn event was not successful or was unsafe. In one embodiment, the U-turn component 104 may automatically log the U-turn event data in response to input by a user on the human interface device 106. For example, the U-turn component 104 may log an event as safe or unsafe based on a number and/or length of button presses on the human interface device 106.

The U-turn component 104 may also provide U-turn event data to the navigation system 102, so that the navigation system can calculate routes that avoid U-turns at locations that are unsafe or unwieldy. For example, the U-turn component 104 may identify unsafe U-turn locations based on vehicle characteristics, such as turning radius, vehicle length, vehicle weight, vehicle model, a length of an attached trailer, and/or the like.

The human interface device 106 may include a human interface to receive input from a user. In one embodiment, the human interface device may include a push button, a switch, a capacitive touch sensor, or any other human-machine interface where input by a user may be detected. In one embodiment, the human interface device 106 also includes a signal generator that generates a signal in response to input from a user. For example, the human interface device 106 may provide a wired or wireless signal in response to a button press. In one embodiment, the signal may indicate that the user pressed a button or otherwise provided input into the human interface device. In one embodiment, the navigation system 102 or U-turn component 104 may detect the signal from the human interface device 106 and determine, based on the signal, that a U-turn event has occurred.

Data store 108 may store data for operation of the navigation system 102 and/or U-turn component 104. For example, the data store 108 may store map data for roads or locations over which a vehicle may navigate or travel. The data store 108 may include information about a driving history of the vehicle or one or more other vehicles. The data store 108 may also store other data such as user preferences, vehicle characteristics, or information about roads, intersections, or potential U-turn locations. The U-turn locations may include locations where a vehicle may perform a U-turn and may include information about a maximum turning radius allowed to complete a U-turn at that location, a traffic level, the presence of turn signals (e.g., stop light turn signals), or any other information that may indicate requirements or dangers of performing a U-turn at specific locations.

The GPS 110 may include a GPS receiver and may determine a location of the GPS receiver and accompanying vehicle. The GPS location may be useful in locating the vehicle on a map so that a route from a current location to a destination may be computed and/or instruction for navigation provided to a user or vehicle. The transceiver 112 may include one or more transceivers or radios for receiving wired or wireless signals. In one embodiment, the transceiver 112 may include one or more of a Bluetooth radio, a Wi-Fi radio, a ZigBee radio, or a radio for communication over a wireless communication network, such as a network that implements a $3^{rd}$ Generation Partnership Project (3GPP) standard. The display(s) 114 may provide visual information to a user to instruct the user to follow a route, such as a route that only includes U-turns that a vehicle can follow or that includes no U-turns. Similarly, the speaker(s) 116 may provide audio information to a user to instruct the user to follow a route.

According to one example scenario, the U-turn logging and routing system 100 may log an occurrence of a U-turn in response to a button press, or other input, on the human interface device 106. For example, a user may press a button on the human interface device 106 and the human interface device 106 may send a signal to the navigation system 102 or U-turn component 104. The U-turn component 104 may retrieve a current time (e.g., from a system clock) and a current location (e.g., from a GPS receiver) and log this information in a U-turn event log. The U-turn component 104 may also retrieve one or more vehicle characteristics for the current vehicle (e.g., vehicle size, trailer length, turning radius) and log that information with the U-turn event. Based on the input, the U-turn component 104 may also include information indicating that the U-turn was successful or safe or that the U-turn was unsuccessful or unsafe. For example, a short press may indicate a successful turn, while two short presses may indicate an unsuccessful or dangerous U-turn attempt.

The vehicle characteristics may be pre-entered by the driver or may be calculated based on sensors mounted on the vehicle. For example, a user may enter one or more vehicle characteristics, such as a vehicle model, before driving. This information may be stored by the U-turn logging and routing system 100, such as the U-turn component 104 or other component. Additional information may also be retrieved, such as a turning radius for that specific vehicle model, and stored for later use. In one embodiment, the vehicle characteristics may also be modified to indicate the presence of one or more trailers attached to the vehicle and/or an overall vehicle length. In one embodiment, the U-turn component 104 may store profiles for a plurality of vehicles so that the driver can bring the navigation system 102 or U-turn component 104 to different vehicles (e.g., may bring a smart phone or other mobile computing device into a plurality of different vehicles). In addition to selecting a vehicle, the driver may also be able to select a specific payload, trailer, or towed item to accurately inform the U-turn component 104 about the turn capabilities of the vehicles. As another example, one or more sensors may detect a model of the vehicle (e.g., by interfacing with an electronic system of the vehicle) or by detecting a presence of a trailer or load. The U-turn component 104 or U-turn logging and routing system 100 may query a vehicle electronic system to obtain the vehicle characteristics and/or an indication of a connected trailer.

In one embodiment, a user may press a button (e.g., a long press) on the human interface device 106 before performing a U-turn in order to obtain input on whether the U-turn is safe. For example, the U-turn component 104 may provide information (in a visual or audio manner) about one or more previous U-turns performed at that location and whether they were successful. The U-turn component 104 may provide a simple yes or no (or recommended or not recommended) to limit distraction for the driver. The driver can then know, in advance, whether the U-turn location will accommodate the vehicle.

The U-turn event data may be shared with a plurality of different users. For example, a cloud based storage and consolidation of the U-turn event data may enable large numbers of people to share and access the U-turn event data. Thus, all drivers may benefit from the added information and experiences from other drivers.

Figure 2:
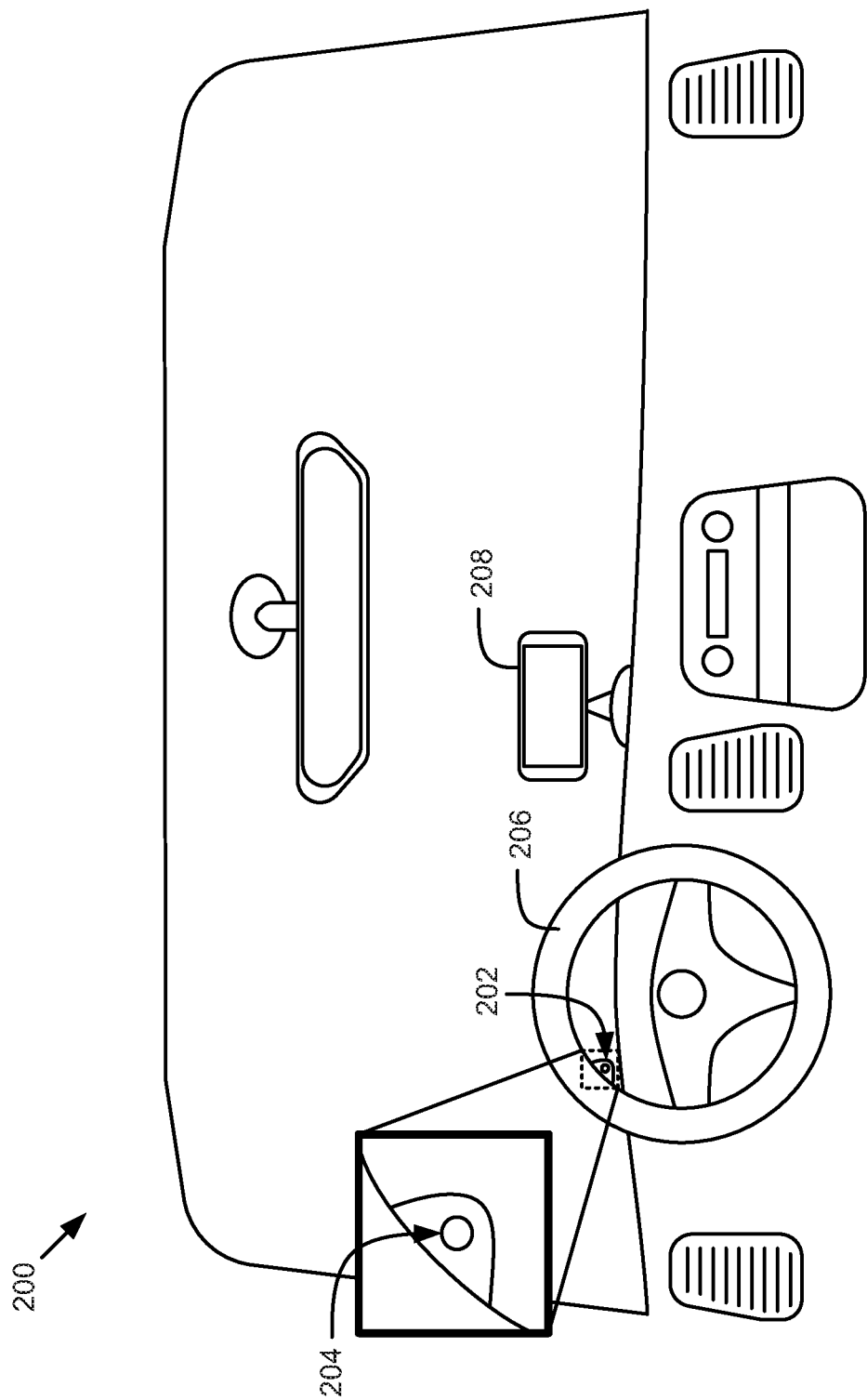
FIG. 2 is a schematic diagram illustrating a human interface device in a view from within a cab of a vehicle, according to one implementation.

FIG. 2 is a schematic dash view 200 of a vehicle. The dash view illustrates a vehicle accessory 202 that includes a button 204 (shown in an enlarged view), which may be selected by a user. The vehicle accessory 202 may include an accessory that has been built into the steering wheel or strapped or attached (e.g., an after-market addition) to the steering wheel. The vehicle accessory 202 is positioned on a steering wheel 206 of the vehicle to allow a driver to easily locate and press the button 204 without significantly diverting the driver's attention from driving or the road. A smart phone 208 (or other mobile computing device) is shown mounted on a dash of the vehicle. The smart phone 208 may receive a signal or command from the vehicle accessory 202 that indicates that the vehicle will be performing or has performed a U-turn maneuver. The smart phone 208 may perform operations of one or more of the navigation system 102 or U-turn component 104 of FIG. 1 to log U-turn events or route the vehicle based on a U-turn event log and/or vehicle characteristics. In another embodiment, an in-dash system may be used as a navigation system 102 and/or U-turn component 104.

Figure 3:
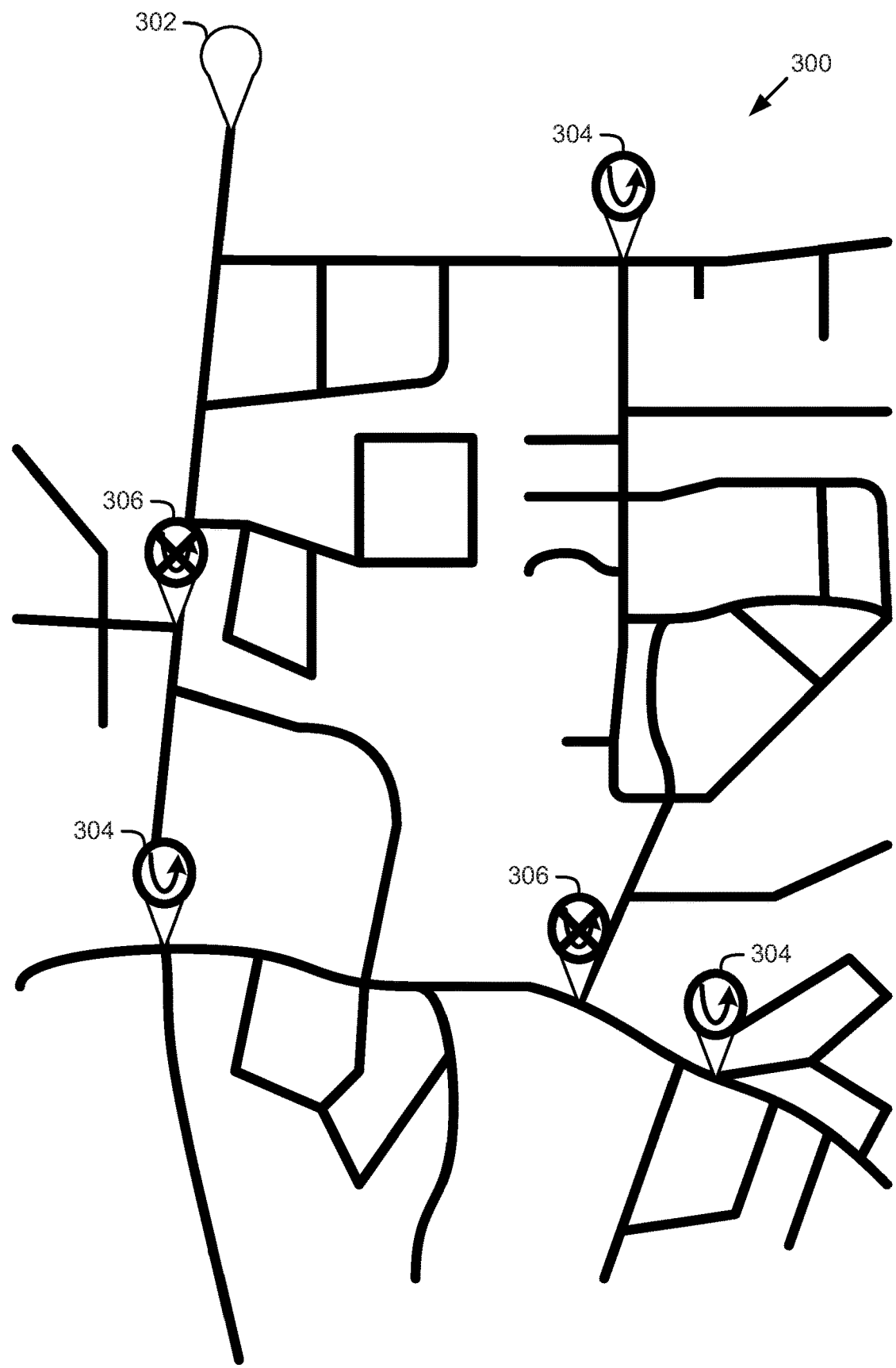
FIG. 3 is a schematic diagram illustrating a road map and indication of recommended and non-recommended U-turn locations on the road map, according to one implementation.

FIG. 3 illustrates a road map 300 for vehicle navigation, according to one embodiment. For example, the road map 300 may be displayed on a display 114 of the U-turn logging and routing system 100 of FIG. 1. A location 302 of the vehicle is shown. The map also shows recommended U-turn locations 304 and non-recommended U-turn locations 306. The recommended U-turn locations 304 may correspond to locations that, based on logged U-turn event data, the current vehicle is likely to be able to successfully and safely perform a U-turn. The non-recommended U-turn locations 304 may correspond to locations that, based on logged U-turn event data, the current vehicle is not likely to be able to successfully and safely perform a U-turn. For example, the U-turn component 104 may determine, based on the vehicle characteristics, which locations the vehicle can perform U-turns. In one embodiment, a navigation view may not show icons for each of the recommended U-turn locations 304 and non-recommended U-turn locations 306, but may route the vehicle to avoid U-turns at the non-recommended U-turn locations 306.

Figure 4:
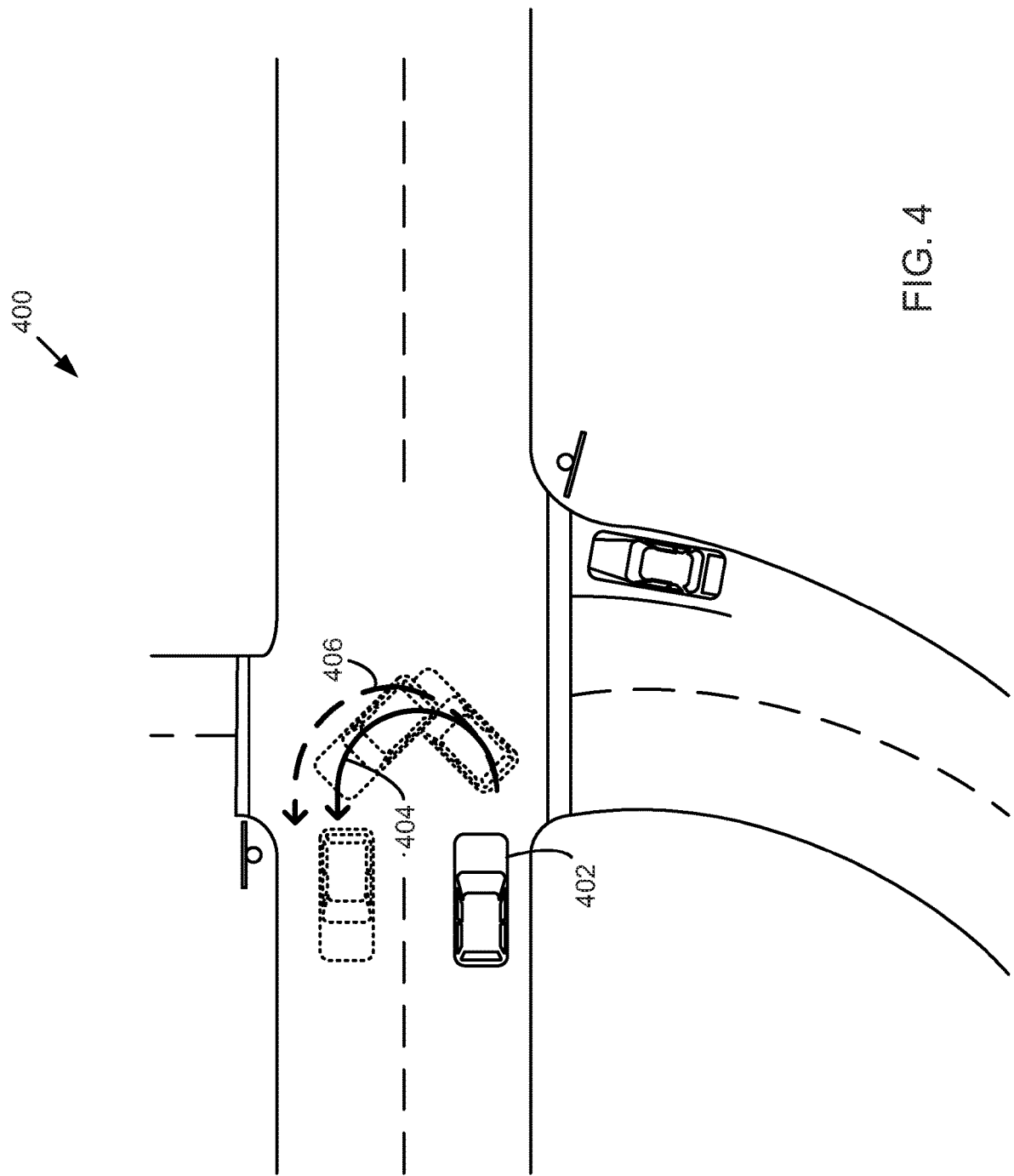
FIG. 4 is a plan view illustrating a road with a vehicle performing a U-turn.

FIG. 4 is a plan view of a road 400 with a vehicle 402 performing a U-turn at an intersection. The vehicle 402 is illustrated with solid lines before the turn and with dotted lines during and after the U-turn maneuver. The vehicle 402 is shown making the U-turn with a vehicle turn radius 404. Line 406 illustrates a maximum turn radius for safely performing a U-turn at the intersection. As illustrated, because the vehicle turn radius 404 is less than the maximum turn radius at line 406, the vehicle 402 is able to safely perform a U-turn maneuver and the U-turn maneuver may be logged as successful. Alternatively, if the vehicle turn radius 404 is greater than the maximum turn radius at line 406, then the vehicle 402 is unable to safely perform a U-turn maneuver and the U-turn maneuver may be logged as unsuccessful. The maximum turn radius (line 406) may be determined based on map data, data gathered by sensors of the vehicle 402 or other vehicles that have driven through the intersection, or based on the largest turn radius of a vehicle that has successfully performed a U-turn at the intersection. In one embodiment, this data may be stored within the data store 108 or accessible over a wireless network for retrieval by the vehicle 402 during route planning or providing an indication to a user whether a U-turn should be performed at that intersection.

Figure 5:
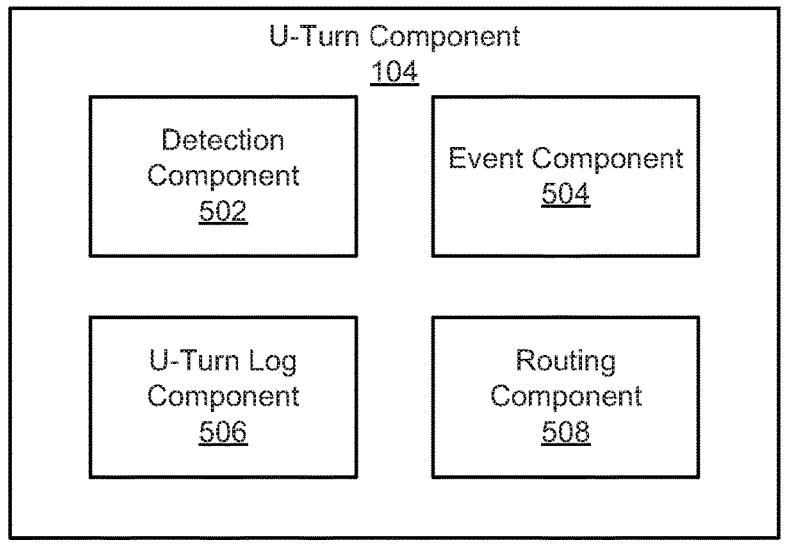
FIG. 5 is a schematic block diagram illustrating components of a U-turn component, according to one implementation.

FIG. 5 is a block diagram illustrating example components of a U-turn component 104. In the depicted embodiment, the U-turn component 104 includes a detection component 502, an event component 504, a U-turn log component 506, and a routing component 508. The components 502-508 are given by way of illustration only and may not all be included in all embodiments. In fact, some embodiments may include only one or any combination of two or more of the components 502-508. Some of the components 502-508 may be located outside the U-turn component 104, such as within the navigation system 102 or elsewhere.

The detection component 502 is configured to detect input on human interface device. In one embodiment, the detection component 502 is configured to detect a button press on the human interface device 106 of FIG. 1. For example, the detection component 502 may receive a signal from the human interface device 106 that indicates that the button has been pressed by a user. In one embodiment, the detection of the button press includes detecting a wireless signal. For example, the U-turn component 104 or navigation system 102 may include a wireless transceiver and may detect a wireless signal from the button device received by the wireless transceiver. In one embodiment, the detection component 502 may receive a Bluetooth signal, a Wi-Fi signal, and a ZigBee signal, or any other wireless signal from a vehicle accessory that indicates input from the user. In one embodiment, the detection component 502 may detect each button press as well as a length of each button press so that the U-turn component 104 can detect a number and/or duration of button presses.

The event component 504 is configured to obtain data or information about a U-turn event. In one embodiment, the event component 504 is configured to retrieve a time, date, and location for the vehicle upon detection of input to the human interface device 106 by the detection component 504. For example, the event component 504 may retrieve a system time from a system clock of a mobile computing device, in-dash navigation system, or the like. The location may be retrieved from a GPS 110. For example, the location of a GPS receiver of a mobile computing device or in-dash navigation system in the vehicle also corresponds to a location of the vehicle.

The event component 504 may also determine one or more vehicle characteristics for a current vehicle. The vehicle characteristics may include one or more of a vehicle length, a vehicle turning radius, a vehicle model, a vehicle weight, a payload weight, a trailer length, a presence of a trailer, a vehicle width, and/or the like. In one embodiment, at least one vehicle characteristic may be retrieved from memory (e.g., from the data store 108). For example, the data store 108 may include a vehicle model or other details entered by a user or details retrieved from an electronic system of the vehicle. The event component 504 may retrieve additional details via wireless network. For example, the event component 504 may retrieve specifics about a vehicle model including a turning radius or other information from a remote location. The information retrieved from the remote location may be stored in memory for later access.

In one embodiment, the event component 504 may determine one or more vehicle characteristics by querying an electronic system of the vehicle or one or more sensors. For example, the event component 504 may interface with a vehicle computer to determine a vehicle model, turning radius, the presence of a payload or trailer, or any other details about the vehicle. In one embodiment, a sensor mounted on a vehicle (e.g., such as LIDAR, radar, or ultrasound system) may detect the dimensions of the vehicle and/or the presence of a trailer or payload.

The event component 504 may also determine specific details about a U-turn or a U-turn location. In one embodiment, the event component 504 determines a success or safety of a U-turn performed by the vehicle or witnessed by a driver. In one embodiment, the event component 504 may determine and indication of one or more of a success of the U-turn event, a safety level of the U-turn event, and a turn radius for the U-turn event. The event component 504 may determine the indication of one or more of the success of the U-turn event, the safety level of the U-turn event, and the turn radius for the U-turn event based on additional input to the human interface device 106. For example, a user may provide first input into the human interface device 106 and after performing the U-turn may provide additional input indicating that the event was one or more of successful, safe, and greater than or equal to a turn radius of the vehicle.

In one embodiment, the event component 504 may determine one or more of the success of the U-turn event, the safety level of the U-turn event, and the turn radius for the U-turn event based on only a single input (e.g., a single set of button presses). For example, the user may provide input only after performing the U-turn event and the event component 504 may determine the success, safety, or radius of the U-turn based on that input and the event component 504 may determine a status of the event based on that input.

In one embodiment, the event component 504 may determine information about the U-turn based on voice input from the user or driver. For example, in response to the detection component 502 detecting the user input, the U-turn component 104 may cause a navigation system 102 or mobile phone to listen for voice input from the user. The U-turn component 104 may receive voice input that indicates that the user input corresponds to a U-turn event. The event component 504 may determine, in response to the user input, a location of a vehicle corresponding to the navigation system 102 and one or more vehicle characteristics of the vehicle. In one embodiment, the event component 504 may determine one or more of the success of the U-turn event, the safety level of the U-turn event, and the turn radius for the U-turn event based on voice input. For example, after performing a U-turn the user may provide additional input additional input to the human interface device and a voice command from the user that indicates a safety, success, or turn radius for the U-turn.

In one embodiment, the event component 504 may determine dimensions of an intersection or limitations on a U-turn based on sensor data. For example, a LIDAR system, radar system, camera, or other type of sensor or sensor system may be used to detect dimensions of lanes, roads, street shoulders, or the like to determine a maximum radius for the U-turn.

The U-turn log component 506 is configured to log U-turn event data. For example, the U-turn log component 506 may log any event data provided by a user or the event component 504. In one embodiment, the U-turn log component 506 may log a time and location for the U-turn as well as and the one or more vehicle characteristics. In one embodiment, the U-turn log component 506 logs the U-turn event data in response to input to the human interface device 106. For example, a single input into the human interface device 106 may result in detection by the detection component 502, obtaining event data by the event component 504, and logging of event data by the U-turn log component 506. In one embodiment, the U-turn log component 506 may log a success, safety, or turning radius for a U-turn at a specific location. In one embodiment, the U-turn log component 506 may log one or more details provided by a user in a voice command or indicated by input to a human interface device 106.

In one embodiment, the U-turn log component 506 automatically creates a log with one or more of a time, location, vehicle characteristic, U-turn event status (e.g., safety level, success, or turning radius), and the like and allows a user to review or edit at a later time. For example, the user may review the U-turn events when the user is finished driving. For example, the user may add one or more notes to the log, correct one or more entries or specifics, and/or approve the U-turn event data to be uploaded and shared with others.

The routing component 508 is configured to select and/or route the vehicle to a desired destination. In one embodiment the routing component 508 is configured to determine locations at which a U-turn should or should not be performed. In one embodiment, the routing component 508 is configured to calculate a route based on logged U-turn event data stored locally or at a remote server. For example, the logged U-turn event data may include data logged by the same user, by different users or for the same or different vehicles. In one embodiment, the routing component 508 may calculate a route based on whether one or more locations allow for a successful or safe U-turn by the specific vehicle currently being driven by a user. For example, the routing component 508 may retrieve one or more vehicle characteristics for the current vehicle or have the event component 504 obtain the vehicle characteristics as mentioned above. In one embodiment, the routing component 508 may determine a route that avoids U-turn locations based on U-turn event data that indicates that the location may be dangerous or difficult for a U-turn in the present vehicle.

In one embodiment, the routing component 508 may filter event data in a log based on one or more characteristics for the current vehicle. For example, the routing component 508 may filter results to locate successful U-turn location by only including U-turn event data that corresponds to events involving a vehicle with the same or greater turning radius or the same or greater vehicle length. As another example, the routing component 508 may filter results to locate unsuccessful U-turn locations by only including U-turn event data that corresponds to events involving a vehicle with the same or smaller turning radius or the same or smaller vehicle length. In one embodiment, for locations that U-turn data is available, the routing component 508 may only allow U-turns where the maximum turning radius less than or equal to the turning radius of the current vehicle.

Figure 6:
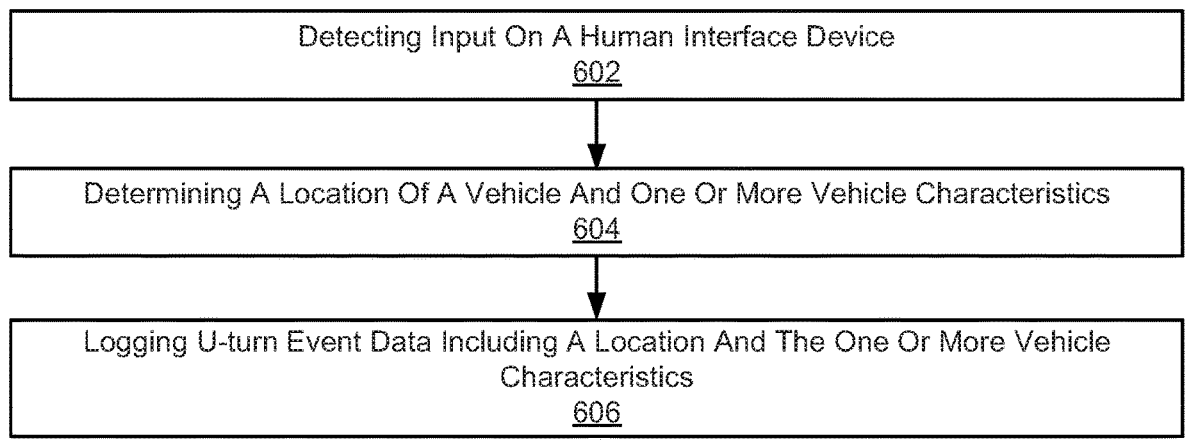
FIG. 6 is a schematic flow chart diagram illustrating a method for logging a U-turn event, according to one implementation.

Referring now to FIG. 6, a schematic flow chart diagram of a method 600 for logging U-turn data is illustrated. The method 600 may be performed by navigation system or a U-turn component, such as the navigation system 102 of FIG. 1 or the U-turn component 104 of FIG. 1 or 5.

The method 600 begins and a detection component 502 detects input on a human interface device at 602. For example, the detection component 502 may detect a button press on a human interface device separate from a navigation system or U-turn component based on a signal received from the human interface device. An event component 504, in response to the user input, determines a location of a vehicle corresponding to the apparatus and one or more vehicle characteristics for the vehicle at 604. A U-turn log component 506 logs at 606 U-turn event data for the vehicle, the U-turn event data includes the location and the one or more vehicle characteristics.

Figure 7:
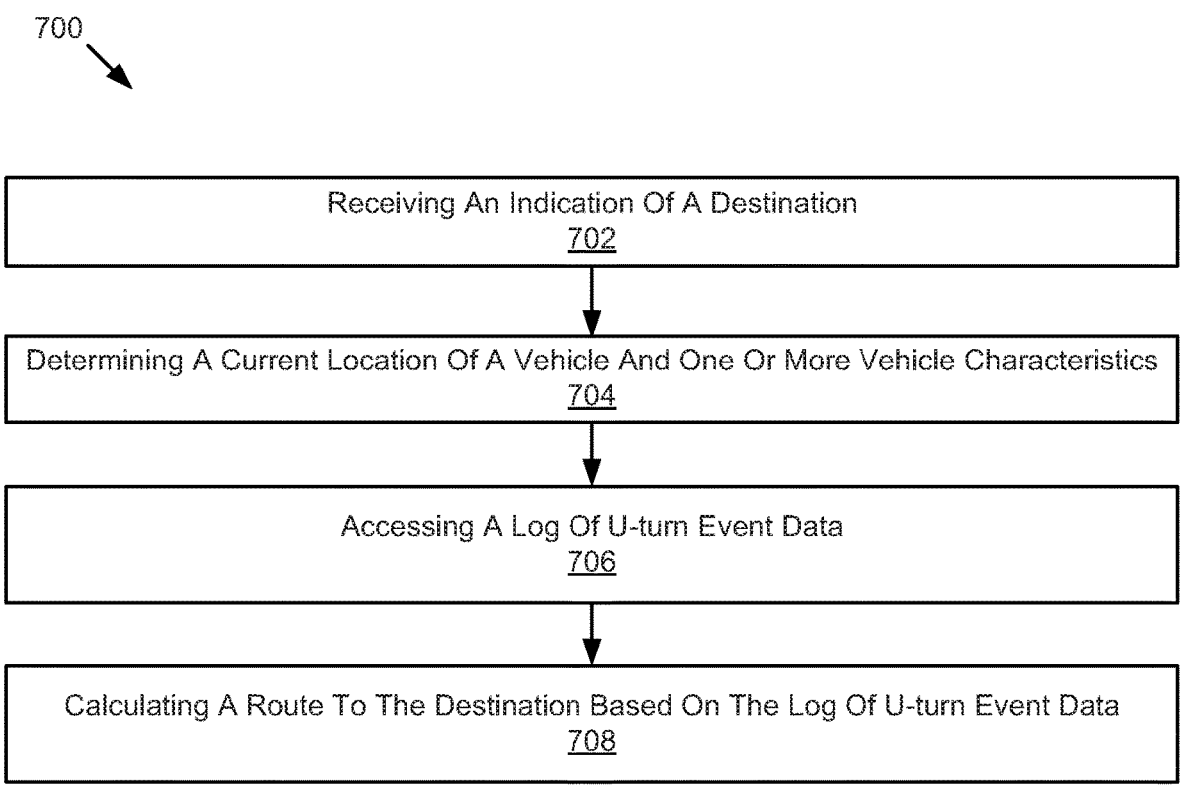
FIG. 7 is a schematic flow chart diagram illustrating a method for routing a vehicle based on U-turn event data, according to one implementation.

Referring now to FIG. 7, a schematic flow chart diagram of a method 700 for routing a vehicle is illustrated. The method 700 may be performed by navigation system or a U-turn component, such as the navigation system 102 of FIG. 1 or the U-turn component 104 of FIG. 1 or 5. In one embodiment, the method 600 of FIG. 6 and the method 700 of FIG. 7 may be combined into a single method or may be implemented by a same device or system.

The method 700 begins and a navigation system 102 or U-turn component 104 receives an indication of a destination for a vehicle or driver to drive at 702. An event component 504 determines a current location of the vehicle and one or more vehicle characteristics at 704. A U-turn log component 506 accesses at 706 a log of U-turn event data. The log of U-turn event data may be located remotely and/or locally to the navigation system 102 or U-turn component 104. The log of U-turn event data may include data from one user or from a plurality of users, such as a community of uses of a same mobile application or navigation system. The routing component 508 calculates at 706 a route to the destination based on the log of U-turn event data. The routing component 508 may avoid creating a route that has U-turns at locations that, based on the log, may be unsuccessful or unsafe for the vehicle having the one or more vehicle characteristic. If a U-turn is needed or may be beneficial, the routing component 508 may attempt to create a route that includes a U-turn at a location, based on the log, which will likely be successful or safe for the vehicle.

EXAMPLES

The following examples pertain to further embodiments.

Example 1 is a method that includes detecting, at a navigation system, a button press on a human interface device separate from the navigation system based on a signal received from the human interface device. The method also includes, in response to the user input, determining a location of a vehicle corresponding to the navigation system and one or more vehicle characteristics. The method includes logging U-turn event data for the vehicle, the U-turn event data including the location and the one or more vehicle characteristics.

In Example 2, determining the one or more vehicle characteristics in Example 1 includes retrieving at least one vehicle characteristic from memory.

In Example 3, the one or more vehicle characteristics in any of Examples 1-2 include one or more of a vehicle length, a vehicle turning radius, and a vehicle model.

In Example 4, the U-turn event data in any of Examples 1-3 further includes an indication of one or more of: a success of the U-turn event; a safety level of the U-turn event; and a turn radius for the U-turn event.

In Example 5, the method of Example 4 further includes determining the indication based on additional input to the human interface device.

In Example 6, the method of Example 4 further includes determining the indication based on a voice input from the user.

In Example 7, the method of any of Examples 1-6 further includes: in response to detecting the user input, listening for voice input from the user; and receiving the voice input, wherein the voice input indicates that the user input corresponds to the U-turn event; wherein logging the U-turn event data comprises logging the U-turn event data in response to the voice input.

In Example 8, the method of any of Examples 1-7 further include routing the vehicle along a route based on a log of U-turn event data, wherein routing comprises avoiding U-turn locations based on one or more previous U-turn events and the vehicle characteristics.

Example 9 is a system that includes a human interface device and a navigation system. The human interface device includes an input sensor and a transceiver. The transceiver is configured to send a signal in response to user input to the input sensor by a user. The navigation system includes a GPS receiver, one or more processors, and computer readable storage media storing instructions that, when executed by one or more processors, cause the processors to detect, at the navigation system, the user input to the human interface device separate from the navigation system based on a signal received from the human interface device. The instructions further cause the processor to, in response to the user input, determine a location of a vehicle corresponding to the navigation system and one or more vehicle characteristics of the vehicle. The instructions further cause the processor to log U-turn event data for the vehicle, the U-turn event data includes the location and the one or more vehicle characteristics.

In Example 10, the computer readable storage of Example 9 further stores at least one vehicle characteristic and determining the one or more vehicle characteristics includes retrieving the at least one vehicle characteristic from the computer readable storage. The one or more vehicle characteristics includes one or more of a vehicle length, a vehicle turning radius, and a vehicle model.

In Example 11, the U-turn event data of any of Examples 9-10 further includes an indication of one or more of: a success of the U-turn event; a user perceived safety of the U-turn event; and a turn radius for the U-turn event.

In Example 12, the instructions of any of Examples 9-11 further cause the processors to determine the indication based on one or more of: additional input to the human interface device; and a voice command from the user.

In Example 13, the instructions of any of Examples 9-12 further cause the processors to route the vehicle along a route based on a log of U-turn event data, wherein routing includes avoiding U-turn locations based on one or more previous U-turn events and the vehicle characteristics.

In Example 14, the human interface device of any of Examples 9-13 includes a button mounted on a steering wheel of the vehicle.

In Example 15, the instructions if Examples 9-14 further cause the processors to transmit the U-turn event data to a server accessible over a wireless communications network.

Example 16 is an apparatus that includes a detection component, an event component, and a U-turn log component. The detection component is configured to detect user input on a human interface device based on a wireless signal received from the human interface device, wherein the human interface device is independent from the apparatus. The event component is configured to, in response to the user input, determine a location of a vehicle corresponding to the apparatus and one or more vehicle characteristics for the vehicle. The U-turn log component is configured to log U-turn event data for the vehicle, the U-turn event data including the location and the one or more vehicle characteristics.

In Example 17, the apparatus of Example 16 further includes a routing component configured to route the vehicle along a route based on a log of U-turn event data, wherein routing includes avoiding U-turn locations based on one or more previous U-turn events and the vehicle characteristics.

In Example 18, the event component of any of Examples 16-17 is configured to determine the one or more vehicle characteristics comprising one or more of a vehicle length, a vehicle turning radius, and a vehicle model.

In Example 19, the log component of any of Examples 16-18 is configured to log the U-turn event data comprising an indication of one or more of: a success of the U-turn event; a user perceived safety of the U-turn event; and a turn radius for the U-turn event.

In Example 20, the event component of any of Examples 16-19 is further configured to determine the indication based on one or more of: additional input to the human interface device; and a voice command from the user.

Example 21 is a system that includes means for implementing a method or realizing a system or apparatus of any of Examples 1-20.

It should be noted that the sensor embodiments discussed above may comprise computer hardware, software, firmware, or any combination thereof to perform at least a portion of their functions. For example, a sensor may include computer code configured to be executed in one or more processors, and may include hardware logic/electrical circuitry controlled by the computer code. These example devices are provided herein purposes of illustration, and are not intended to be limiting. Embodiments of the present disclosure may be implemented in further types of devices, as would be known to persons skilled in the relevant art(s).

Embodiments of the disclosure have been directed to computer program products comprising such logic (e.g., in the form of software) stored on any computer useable medium. Such software, when executed in one or more data processing devices, causes a device to operate as described herein.

While various embodiments of the present disclosure have been described above, it should be understood that they have been presented by way of example only, and not limitation. It will be apparent to persons skilled in the relevant art that various changes in form and detail can be made therein without departing from the spirit and scope of the disclosure. Thus, the breadth and scope of the present disclosure should not be limited by any of the above-described exemplary embodiments, but should be defined only in accordance with the following claims and their equivalents. The foregoing description has been presented for the purposes of illustration and description. It is not intended to be exhaustive or to limit the disclosure to the precise form disclosed. Many modifications and variations are possible in light of the above teaching. Further, it should be noted that any or all of the aforementioned alternate implementations may be used in any combination desired to form additional hybrid implementations of the disclosure.

Further, although specific implementations of the disclosure have been described and illustrated, the disclosure is not to be limited to the specific forms or arrangements of parts so described and illustrated. The scope of the disclosure is to be defined by the claims appended hereto, any future claims submitted here and in different applications, and their equivalents.

What is claimed is:

1. A method comprising:
receiving an input via a human interface device indicating an outcome of an attempted U-turn driving maneuver performed by a vehicle;
determining a location of the vehicle at a time when the input was received based on data received from a global positioning system (GPS);
determining a characteristic of the vehicle comprising one or more of model, length, turning radius, or presence of trailer;
sending the input, the location, and the characteristic to an Internet-accessible server to be stored on the Internet-accessible server; and
updating a map to comprise one or more of the input, the location, or the characteristic;
wherein the map is accessible to a plurality of vehicles such that the plurality of vehicles can calculate a driving route based at least in part on the map.

2. The method of claim 1, wherein determining the characteristic of the vehicle comprises retrieving at least one vehicle characteristic from memory.

3. The method of claim 1, wherein the human interface device is a mechanical button.

4. The method of claim 1, wherein the outcome of the attempted U-turn driving maneuver comprises an indication of one or more of:
a success of the attempted U-turn driving maneuver;
a safety level of the attempted U-turn driving maneuver; or
a turn radius for the attempted U-turn driving maneuver.

5. The method of claim 1, wherein the input is received from a driver of the vehicle or a driver of a proximal vehicle that is independent of the vehicle.

6. The method of claim 1, wherein the input is a voice input and the human interface device is a device in communication with the Internet-accessible server.

7. The method of claim 1, wherein the human interface device comprises a smartphone in communication with the Internet-accessible server, and wherein determining the characteristic of the vehicle comprises retrieving the characteristic from memory.

8. The method of claim 1, wherein the map comprises a plurality of indications of attempted U-turn driving maneuvers, and wherein the method further comprises calculating a driving route based on the map such that the driving route is calculated based at least in part on information pertaining to a stored attempted U-turn driving maneuver stored in the map.

9. A system comprising one or more processors configurable to execute instructions stored in non-transitory computer readable storage media, the instructions comprising:
receiving an input via a human interface device comprising an input sensor and a transceiver, wherein the input indicates an outcome of an attempted U-turn driving maneuver performed by a vehicle; and
determining a location of the vehicle at a time when the input was received based on data received from a global positioning system (GPS) receiver;
determining a characteristic of the vehicle comprising one or more of model, length, turning radius, or presence of trailer;
sending the input, the location, and the characteristic to an Internet-accessible server to be stored on the Internet-accessible server; and
updating a map to comprise one or more of the input, the location, or the characteristic;
wherein the map is accessible to a plurality of vehicles such that the plurality of vehicles can calculate a driving route based at least in part on the map.

10. The system of claim 9, wherein the instructions are such that determining the characteristic of the vehicle comprises retrieving the at least one vehicle characteristic from memory.

11. The system of claim 9, wherein the outcome of the attempted U-turn driving maneuver comprises an indication of one or more of:
a success of the attempted U-turn driving maneuver;
a safety level of the attempted U-turn driving maneuver; or
a turn radius for the attempted U-turn driving maneuver.

12. The system of claim 9, wherein the input is received from a driver of the vehicle or a driver of a proximal vehicle that is independent of the vehicle.

13. The system of claim 9, wherein the map comprises a plurality of indications of attempted U-turn driving maneuvers, and wherein the instructions further comprise calculating a driving route based on the map such that the driving route is calculated based at least in part on information pertaining to a stored attempted U-turn driving maneuver stored in the map.

14. The system of claim 9, wherein the human interface device comprises a button mounted on a steering wheel of the vehicle.

15. The system of claim 9, wherein the human interface device is a smartphone in communication with the Internet-accessible server, and wherein the instructions are such that determining the characteristic of the vehicle comprises retrieving the characteristic from memory.

16. Non-transitory computer readable storage media storing instructions for execution by one or more processors, the instructions comprising:
receiving an input via a human interface device, wherein the input indicates an outcome of an attempted U-turn driving maneuver performed by a vehicle;
determining a location of the vehicle at a time when the input was received based on data received from a global positioning system (GPS);
determining a characteristic of the vehicle comprising one or more of model, length, turning radius, or presence of trailer;

sending the input, the location, and the characteristic to an Internet-accessible server to be stored on the Internet-accessible server; and updating a map to comprise one or more of the input, the location, or the characteristic;

wherein the map is accessible to a plurality of vehicles such that the plurality of vehicles can calculate a driving route based at least in part on the map.

17. The non-transitory computer readable storage media of claim 16, wherein the map comprises a plurality of indications of attempted U-turn driving maneuvers, and wherein the instructions further comprise calculating a driving route based on the map such that the driving route is calculated based at least in part on information pertaining to a stored attempted U-turn driving maneuver stored in the map.

18. The non-transitory computer readable storage media of claim 16, wherein the human interface device is a mechanical button.

19. The non-transitory computer readable storage media of claim 16, wherein the outcome of the attempted U-turn driving maneuver comprises an indication of one or more of:
   a success of the attempted U-turn driving maneuver;
   a safety level of the attempted U-turn driving maneuver; or
   a turn radius for the attempted U-turn driving maneuver.

20. The non-transitory computer readable storage media of claim 16, wherein the human interface device comprises a smartphone in communication with the Internet-accessible server, and wherein determining the characteristic of the vehicle comprises retrieving the characteristic from memory.

* * * * *